April 26, 1949.　　　　D. D. GRIEG　　　　2,468,058
BLOCKING SYSTEM FOR MULTICHANNEL OPERATIONS
Filed Nov. 23, 1943　　　　　　　　　　2 Sheets-Sheet 2
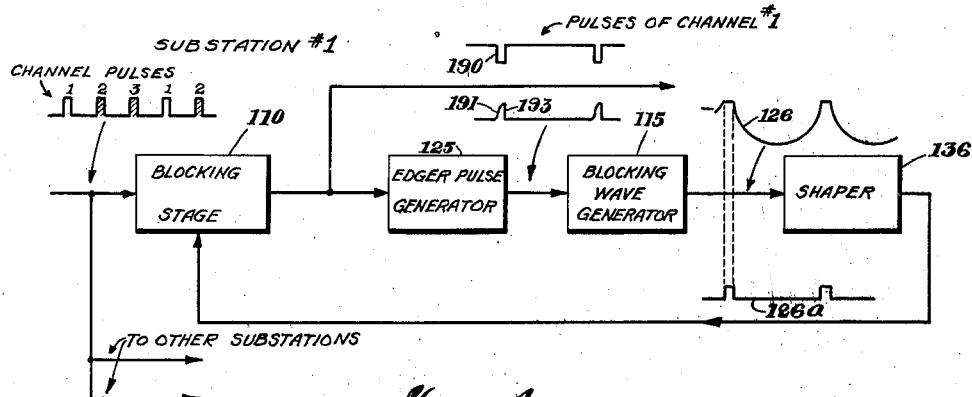
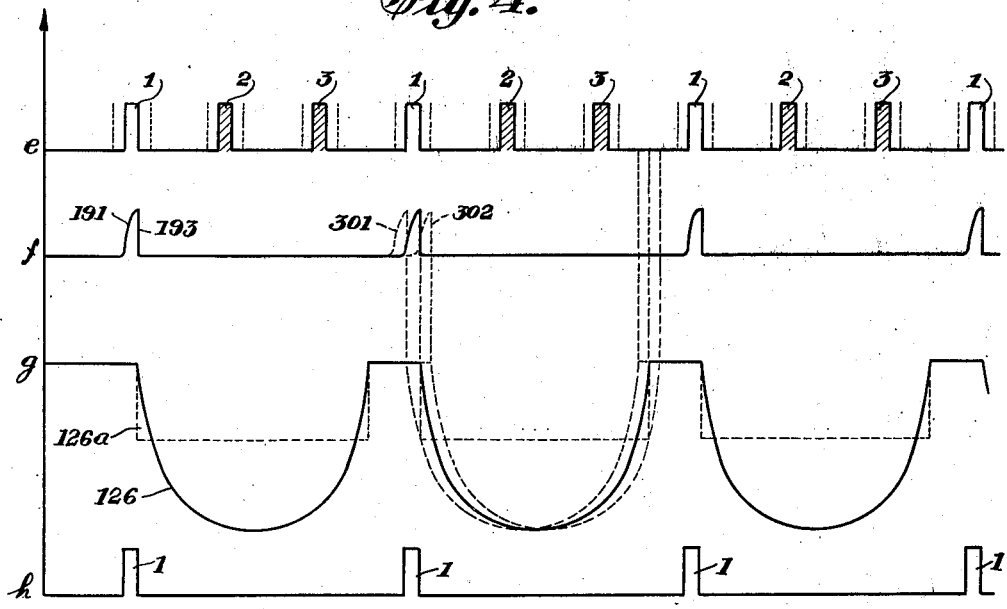
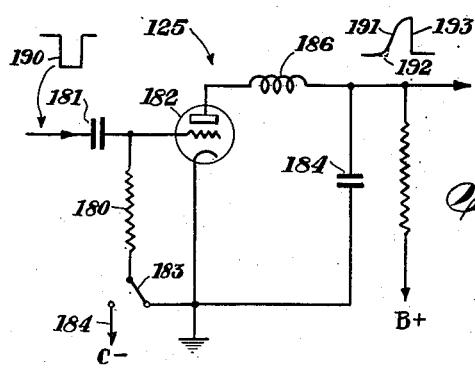
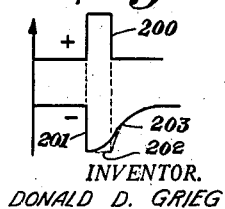
INVENTOR.
DONALD D. GRIEG
BY
ATTORNEY Patented Apr. 26, 1949

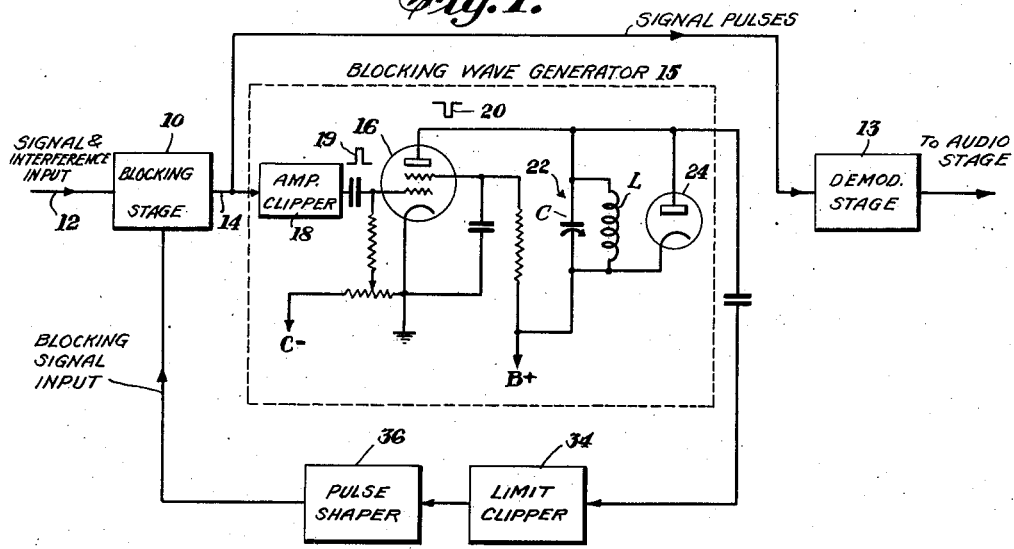
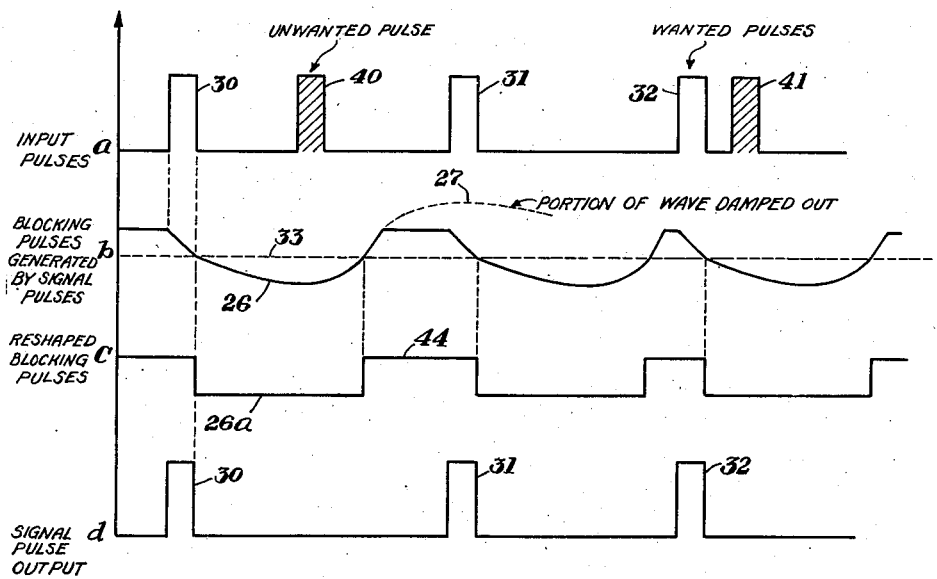

2,468,058

UNITED STATES PATENT OFFICE 2,468,058

BLOCKING SYSTEM FOR MULTICHANNEL OPERATION

Donald D. Grieg, Forest Hills, N. Y., assignor to Federal Telephone and Radio Corporation, New York, N. Y., a corporation of Delaware Application November 23, 1943, Serial No. 511,405

6 Claims. (Cl. 179—15)

This invention relates to pulse communication systems and more particularly to blocking systems for receivers of signal pulses whether the pulses are time modulated, frequency modulated, or amplitude modulated.

T. M. (time modulation) systems are known wherein the pulses are time displaced to one side or another in "push-pull" manner about a given "norm" according to the degree of modulation. The pulses may be symmetrically timed when unmodulated or they may be biased to offset position in the manner disclosed in the copending application of E. Labin and applicant, Serial No. 455,897, filed August 24, 1942, patented February 25, 1947, No. 2,416,329. The offset biased relation of the pulses according to the method of time modulation in the copending application groups the pulses in pairs, that is, the time interval between pulses of a pair is different from the time interval between the last pulse in one pair and the first pulse in the next succeeding pair.

No matter how the pulses are normally timed, it will be clear that to minimize interference during reception of T. M. pulses the occurrence of unwanted or interference pulses during the intervals between T. M. pulses should be suppressed. To accomplish suppression of the unwanted pulses in T. M. and A. M. transmission, a system for blocking the unwanted pulses occurring between the signal pulses has been proposed heretofore which takes advantage of the unique periodicity of the T. M. and A. M. pulses. The T. M. pulses, for example, are utilized to generate a base wave which is fixed in phase and amplitude and which is subsequently shaped into a rectangular pulse wave form to control the blocking and unblocking of a receiver during the intervals between T. M. pulses. The base wave is obtained by selective circuits tuned to an even harmonic of the T. M. fundamental pulse rate. Advantage is taken of the fact that with "push-pull" time modulation, the even harmonics are unmodulated in phase and only amplitude modulated by a small percentage by the usual small displacements of the T. M. pulses. As regards A. M. pulses, the generation of a blocking and unblocking wave is even more simple since in A. M. pulse transmission the pulses usually recur regularly.

This method of blocking, while very useful in most receiver circuits, has a few disadvantages. The phasing of the blocking pulse, for example, is not automatic and manual adjustment is necessary. Due to this factor, unwanted pulses or receiver noise may take control necessitating frequent readjustment. For large time displacement of the T. M. pulses, the amplitude modulation of the even harmonics is no longer negligible and high "Q" circuits or special limiter circuits become necessary in order to remove the amplitude variations. At the higher audio modulating frequencies, the T. M. displacement departs from the normal "push-pull" operation resulting in a phase modulation of the blocking wave and this interferes with the blocking accuracy. These various disadvantages become progressively more severe as the T. M. displacement increases.

As regards F. M. (frequency modulated) pulses, the aforementioned blocking system is not satisfactory since in F. M. pulse transmission there is no periodicity of pulses for synchronizing the generation of the base or blocking wave.

It is one of the objects of my invention to provide an improved interference limiter in which the means for blocking unwanted pulses in pulse signalling systems overcomes the disadvantages mentioned above.

Another object of the invention is to provide an interference limiter system for discriminating between wanted and unwanted pulses which is relatively simple in construction and automatic in operation.

Another object of the invention is to provide a pulse by pulse blocking system.

A further object of the invention is to provide a system for suppressing unwanted pulses and/or interference noise occurring during the major portion of the time interval between successive signal pulses whether the pulses are time modulated or frequency modulated.

A still further object of the invention is to provide a frequency or pulse divider which preserves the original pulse shapes; and one by which the pulses of a particular channel in a multiplexing system can be segregated from the pulses of other channels.

According to the principles of this invention, each wanted pulse produces the blocking pulse required for suppressing unwanted pulses occurring during substantially the entire interval between such wanted pulse and the next succeeding wanted pulse. For T. M. pulses where the pulses are "push-pull" modulated and/or biased to offset relationship, the duration of the blocking pulse is selected equal to the minimum interval that occurs between any two successive T. M. pulses. Likewise, the blocking pulse for F. M. pulse transmission is selected equal to the minimum interval that can occur between any two successive F. M. pulses. For A. M. pulse transmission the duration of the blocking pulse may be selected substantially equal to the time interval between such pulses where the pulses recur regularly. Should the system be used for dividing a train of regularly recurring pulses whether the pulses are time or amplitude modulated, the duration of the blocking pulse is adjusted according to the per cent of the pulses to be divided out of the train.

For a further understanding of the invention, reference may be had to the following detailed description to be read in connection with the accompanying drawings, in which:

Fig. 1 is a schematic circuit and block diagram of a part of a receiver provided with an interference limiter according to the principles of this invention;

Fig. 2 is a graphical illustration used for explaining the embodiment shown in Fig. 1;

Fig. 3 is a block diagram showing fragmentarily one terminal of a multiplex signalling system in which the sub-stations thereof are provided with the blocking feature of this invention;

Fig. 4 is a graphical illustration used for explaining the embodiment shown in Fig. 3;

Fig. 5 is a schematic wiring diagram of a form of edger pulse generator that may be used in the system of Fig. 3; and Fig. 6 is a graphical illustration of the input and output pulse shapes for one operation of the generator shown in Fig. 5.

Referring to Figs. 1 and 2, the blocking stage 10 may comprise a well known amplifier of the so-called "cut-off" type for the purpose indicated, the bias of the tube being controlled by energy of a blocking wave hereinafter described. The signal pulses applied to the blocking stage 10 over input connection 12 may comprise any form of pulse modulation such as time modulation, frequency modulation or amplitude modulation together with interference pulses and noise effects that may occur on the same wavelength. In curve $a$ of Fig. 2, I show, for purposes of illustrating the principles of my invention, two series of pulses, one series representing interference or unwanted pulses and the other series representing the wanted pulses modulated with intelligence in accordance with one of the three modulating methods mentioned above.

The output connection 14 of the stage 10 is connected to a demodulator stage 13 and a blocking wave generator 15. The circuit of the generator 15 is similar to the circuit disclosed in the copending application of E. Labin and applicant, Serial No. 487,072, filed May 15, 1943, U. S. Patent No. 2,440,278, granted April 27, 1948, for pulse width selection including a tunable resonant circuit and damper tube arrangement whereby pulses of a given width are separatable from pulses of other widths. In this invention, however, the resonant circuit and damper tube are arranged to produce, in response to a signal pulse, a blocking pulse of a selected width.

A signal pulse from the stage 10 is fed to a coupling tube 16 through an amplifier-clipper stage 18 which conforms the signal pulses to a constant amplitude. This clipper stage is particularly useful for reception of A. M. pulses although the coupling tube 16 may be so biased as to amplify and limit the pulses in a similar manner to the exclusion of the stage 18. This clipping function may be performed, however, for reception of T. M. and F. M. pulses in the R. F. or I. F. stages of the receiver, but for simplicity the circuit is shown to include a separate clipping stage 18 for clipping the signal pulses regardless whichever form of modulation is involved.

When a signal pulse 19 is applied to the coupling tube 16, it is inverted as indicated at 20. The inverted pulse 20 shock excites the tunable resonant circuit 22 which includes a capacitance C and an inductance L. The resonant circuit is tuned by adjusting the capacitance C, although the inductance L may also be made adjustable if desired. By proper tuning, a train or wave of oscillations is produced in response to each signal pulse, one-half the period of which is equal to the blocking time interval. The blocking pulse is obtained from this wave by means of the damping function of the diode tube 24. The plate and cathode of the diode are connected across the resonant circuit so that when the resonant circuit is shocked into oscillation by a signal pulse 30 as indicated by the undulations 26 and 27 (see curves $a$ and $b$, Fig. 2), the diode acts as an open circuit for the duration of the negative undulation 26 but as soon as the oscillation passes from negative undulation 26 to positive undulation 27, the tube conducts thereby shunting the resonant circuit. This shunting action absorbs the oscillatory energy and damps out further tendency of the circuit to oscillate, thereby leaving negative undulation 26 which may be used as the blocking potential.

It will thus be understood that by properly tuning the resonant circuit 22, the negative undulation 26, for a given input pulse, may be varied in duration as desired. The duration of undulation 26 is preferably selected so as to damp out substantially all of the interval between adjacent signal pulses. This production of a blocking potential for the entire interval between adjacent signal pulses is easily and accurately produced for A. M. pulses which recur regularly. For T. M. pulses which are displaced in time and in the case of F. M. pulses where the repetition rate or frequency of the pulses vary according to the intelligence with which the pulses are modulated, the adjustment of the blocking undulation 26 is limited to the minimum time interval occurrable between any two successive signal pulses.

It will be noted that in curve $b$, the undulation 26 is initiated by the leading edge of the pulse 30 and that the trailing edge of the pulse 30 opposes in an opposite polarity direction the excitation of the circuit thereby distorting the undulation 26, the amount of distortion depending upon the width of the pulse 30 and the tuning of the resonant circuit 22. For a further understanding of the different effects produced on a given tuning adjustment of the resonant circuit by pulses of different widths, reference may be had to the aforementioned copending application, Serial No. 487,072.

In view of the fact that the leading edge of the pulse 30 initiates the undulation 26, it will be necessary to either retard the undulation, the width of the pulse 30, or to clip the undulation by passing it through a limit clipper 34. The clipper 34 is preferably adjusted to clip at a level 33 so as to intersect the leading portion of the undulation 26 at a point substantially in coincidence with the timing of the trailing edge of the pulse 30. The clipping level may be selected, of course, to retard the occurrence of the blocking pulse with respect to the leading edge of the signal pulse amounts more or less than that indicated in Fig. 2 if desired. If desired, the clipped undulation 26 may be further shaped by applying it to a pulse shaper 36 which may include a known form of multivibrator or known amplifier and limit clipping circuits whereby a rectangular pulse 26a of curve c is produced. If this latter form of shaper is used, the clipper 34 may be dispensed with since its function could then be performed by the shaper. The rectangular shape of the blocking pulse 26a is preferable since it provides a blocking voltage of a predetermined value for the complete duration of the time interval to be blocked.

The blocking pulses of curve c are applied to the stage 10 whereby the operation of the stage is blocked for the interval of time corresponding to the duration of the blocking pulse 26a directly following the pulse 30. It will thus be seen from the graph of Fig. 2 that the unwanted pulses 40 and 41 are blocked by the stage 10 while the wanted pulses 30, 31 and 32 are passed as indicated by curve d. The termination of each blocking pulse returns the stage back to normal operation where it remains until the next succeeding signal pulse occurs. This is indicated by the unblocking portion 44 of the curve c. The blocking function is then repeated whereby each signal pulse operates to produce the next succeeding blocking pulse. It will be clear that regardless of the modulation characteristic of the signal pulse, this pulse by pulse blocking operation continues.

Should an interference pulse produce the first blocking pulse when the circuit is tuned to a given wavelength, it will operate to block out for a given interval of time the succeeding pulses. Since interference pulses, either from jamming attempts or other interference sources, are usually of a repetition rate different from the repetition rate characteristics of the signal pulses, the signal pulses for which the circuit 22 is tuned will quickly assume control.

In Fig. 3 a fragmentary portion of a terminal for a multiplexing system is shown wherein substation No. 1 is shown to include a blocking stage 110, a blocking wave generator 115 and a shaper circuit 136, similarly as shown in Fig. 1. In this embodiment the blocking wave generator is arranged to provide a blocking undulation 126 or in connection with shaper 136 to produce a rectangular blocking pulse 136a, either of which is of such duration as to block out all the pulses of other channels interposed between the succeeding pulses of a given channel.

Curve e of Fig. 4 shows a train of channel pulses in which pulses 1 represent channel 1 and pulses 2 and 3 represent channels 2 and 3, respectively. To segregate the pulses of channel 1 from the pulses of other channels at substation No. 1, the resonant circuit of the blocking wave generator is adjusted to produce a blocking pulse 126a of a duration which will effectively suppress reception of the pulses of channels 2 and 3 at the stage 110. The other sub-stations of the terminal will be arranged to similarly suppress the pulses of unwanted channels so as to receive the pulses of the proper channel. Any suitable monitoring method may be provided for setting the blocking wave generator in operation for the proper channel.

In Fig. 3 I have shown preceding the blocking wave generator 115 an edger pulse generator 125 which is one of the forms shown in my copending application for "Pulse generator systems," Serial No. 511,406, filed November 23, 1943, U. S. Patent No. 2,434,920, granted January 27, 1948, whereby the signal pulse is translated into an edger pulse having leading and trailing edges in which one of the edges is substantially vertical and the other curved gradually. The purpose of this translation of the pulse shape is to widen the signal pulse and to eliminate, as far as practical, the shock excitation effect of one of the edges. The circuit for producing this translation is shown in Fig. 5. The grid of the tube 182 of the edger pulse generator may be biased with zero potential as indicated by the present position of the switch 183 or with a negative bias by changing position to the negative source of potential 184. The resistor 180 and the condenser 181 are so chosen as to provide a time constant to pass the incoming signal pulse substantially as received. The plate circuit of the tube 182 includes an inductance 186 which is used for smoothing out corner effects that are produced in the curved portion of the edger pulse when a rectangular signal pulse is applied to the grid of the tube.

Assuming that a negative pulse 190 is applied to the grid of the tube 182 with the tube at zero bias, the negative pulse will drive the tube to cut-off thereby permitting the plate current to charge the condenser 184 for the duration of the negative pulse thereby producing a curved build-up portion constituting a curved leading edge 191 for the edger pulse. The inductance 186 operates to smooth out the corner effect indicated at 192 which would otherwise be produced by the abruptness of the leading edge of the input pulse. The inductance, of course, also effects a rounding of other parts of the curve but this is not illustrated as the most important features in this invention relates to the curving as shown of the leading edge. When the trailing edge of the input pulse occurs, thereby returning the tube to zero bias, the condenser 184 discharges rapidly thereby producing a substantially vertical trailing edge 193 for the edger pulse. The return or trailing edge of the pulse is not strictly vertical but may be made so rapid by the low impedance of the tube that it appears substantially vertical on an oscilloscope screen, for example.

It will be seen that by thus operating the circuit of Fig. 5, an edger pulse is produced in which the leading edge is curved and the trailing edge is substantially vertical.

By changing the switch 183 to apply a negative potential to the grid of the tube 182 thereby normally driving the tube to cut-off, an edger pulse will be produced for positive input pulses wherein the leading edge is substantially vertical and the trailing edge is curved. This is illustrated graphically in Fig. 6 wherein positive pulse 200 is applied to the grid of the tube 182 with the tube biased to cut-off. The leading edge of the input pulse 200 causes the tube 182 to conduct and discharge the condenser 184 thereby producing the substantially vertical edge 201 for the edger pulse. The tube 182 is caused to conduct current for the duration of the pulse 200 which, in the absence of the inductance 186, would produce on the edger pulse a constant voltage condition as indicated at 202. The trailing edge of the input pulse 200 returns the tube to cut-off thereby permitting the condenser 184 to recharge as indicated by the curved portion 203. The inductance 186, however, smooths out the corner effect produced by the constant voltage condition indicated at 202 thereby resulting in a final curved trailing edge for the edger pulse which is of negligible effect when applied to the tuned circuit 22 of Fig. 1.

The graphical illustrations of the edger pulses in Figs. 3 and 4 show the edger pulse generator to be at zero bias as referred to in connection with Fig. 5 whereby the edger pulse has a curved leading edge 191 and a substantially vertical trailing edge 193. The substantially vertical trailing edge of the edger pulse corresponds with the trailing edge of the initiating signal pulse. The initiation of the resulting blocking undulation or pulse is thus timed to the trailing edge of the signal pulse.

The pulses of curve e are indicated as time modulated, the broken lines on each side of the channel pulses representing the limits of displacement caused by modulation. It will be clear that regardless of the displacement of the pulse initiating the blocking pulse, the blocking pulse will change in time accordingly. This necessitates a safety zone between the pulses of adjacent channels so that, for the limits of time modulation of one signal pulse, they will not interfere with the pulses of other channels, the blocking pulse thus always terminating in the safety zone between the pulses of adjacent channels. This is illustrated by the broken line positions 301 and 302 in curves f and g of Fig. 4.

From the foregoing description it will be clear that each wanted signal pulse produces the blocking pulse required for blocking the time interval between such pulse and the next wanted pulse, the system thus being automatically synchronized and requiring no phasing control. Further, where the signal pulses vary in timing or the frequency of their repetition rate because of modulation or other cause, the blocking pulses follow the shifts in time position of the signal pulses producing same.

While I have described above the principles of my invention in connection with specific apparatus, and particular modifications thereof, it is to be clearly understood that this description is made only by way of example and not as a limitation on the scope of my invention and the accompanying claims.

I claim:

1. A system for blocking receiver operation for a portion of each time interval occurring between successive signal pulses of a given train of signal pulses comprising valve means for receiving the train of signal pulses, a resonant circuit adapted to be shock excited by a pulse to produce a wave of oscillations of a selected frequency the period of which is equal to twice the duration of the portion of each time interval to be blocked, means for translating each signal pulse into a shaped pulse having leading and trailing edges in which one of said edges is substantially vertical and the other of said edges is curved gradually, means for applying each shaped pulse to shock excite said circuit into oscillations in response to said vertical edge, said curved edge having negligible effect upon such oscillations regardless of the frequency to which the circuit is tuned and the width of the signal pulse, means for passing one half cycle only of said oscillations for use as a blocking pulse, and means to apply said blocking pulse to said valve means to block its operation during said portion of the time interval between the signal pulse producing such blocking pulse and the next succeeding signal pulse.

2. The system defined in claim 1 wherein the means for producing the shaped pulse is arranged to make the leading edge thereof substantially vertical and the trailing edge thereof curved exponentially, whereby the initiation of the oscillations in said circuit is timed to said leading edge.

3. The system defined in claim 1 wherein the means for producing the shaped pulse is arranged to make the leading edge curved to represent a gradual build-up and the trailing edge substantially vertical, whereby the initiation of the oscillations in said circuit is timed to said trailing edge.

4. In a multiplex signalling system having a terminal provided with a plurality of sub-stations to which the pulses of a plurality of channels time modulated in accordance with intelligence conveyed by the respective channels are applied, the pulses of said channels being interleaved together so that the pulses of any particular channels have the intervals between successive pulses thereof filled with pulses of other channels, each of said sub-stations having means to segregate the pulses of a selected channel from the pulses of other channels including means for receiving the pulses, means responsive to each pulse of a selected channel to produce blocking pulses of a duration substantially equal to the minimum interval occurrable between successive pulses of a given channel, and means to apply said blocking pulses to said first-named means to block its operation for the duration of such blocking pulse.

5. In a multiplex signalling system having a terminal provided with a plurality of sub-stations to which the pulses of a plurality of channels are applied, the channel pulses being amplitude modulated and being interleaved together so that the pulses of any particular channels have the intervals between successive pulses thereof filled with pulses of other channels, each of said sub-stations having means to segregate the pulses of a selected channel from the pulses of other channels including means for receiving the pulses, means responsive to each pulse of a selected channel comprising means for translating the amplitude modulated pulses of said selected channel into pulses of substantially constant amplitude, means responsive to each of said constant amplitude pulses to produce a wave of oscillations at a selected frequency one-half the period of which is equal to the interval of time occurring between successive pulses of said selected channel, means for passing one undulation only of said oscillations for use as a blocking pulse, and means to apply said blocking pulse to said first-named means to block its operation for the duration of said blocking pulse.

6. In a multiplex signalling system having a terminal provided with a plurality of sub-stations to which the pulses of a plurality of channels are applied, the pulses in said channels being interleaved together so that the pulses of any particular channel have the intervals between successive pulses thereof filled with pulses of other channels, each of said sub-stations having means to segregate the pulses of a selected channel from the pulses of other channels including means for receiving the pulses, means responsive to each pulse of a selected channel to produce a blocking pulse including means responsive to each of the pulses of said selected channel to produce a wave of oscillations of a selected frequency one-half the period of which is equal to the time interval to be blocked between successive pulses, means for passing one undulation only of said oscillations for use as a blocking pulse, and means to apply said blocking pulse to said first-named means to block its operation for the duration of such blocking pulse.

DONALD D. GRIEG.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,141,343 | Campbell | Dec. 27, 1938 |
| 2,153,202 | Nichols | Apr. 4, 1939 |
| Re. 21,103 | Lemmon | May 30, 1939 |
| 2,181,309 | Andrieu | Nov. 28, 1939 |
| 2,212,173 | Wheeler, et al. | Aug. 20, 1940 |
| 2,221,665 | Wilson | Nov. 12, 1940 |
| 2,223,995 | Kotowski et al. | Dec. 3, 1940 |
| 2,255,403 | Wheeler | Sept. 9, 1941 |
| 2,262,838 | Deloraine et al. | Nov. 18, 1941 |
| 2,266,401 | Reeves | Dec. 16, 1941 |
| 2,273,193 | Heising | Feb. 17, 1942 |
| 2,277,000 | Bungley | Mar. 17, 1942 |
| 2,326,584 | Van Zelst | Aug. 10, 1943 |
| 2,361,437 | Trevor | Oct. 31, 1944 |
| 2,406,019 | Labin | Aug. 20, 1946 |

FOREIGN PATENTS

| Number | Country | Date |
|---|---|---|
| 107,520 | Australia | June 8, 1939 |
| 438,568 | Great Britain | Nov. 19, 1935 |
| 474,690 | Great Britain | Nov. 5, 1937 |
| 480,572 | Great Britain | Feb. 24, 1938 |
| 520,606 | Great Britain | Apr. 29, 1940 |